US008116567B2

(12) United States Patent
Tzadok et al.

(10) Patent No.: US 8,116,567 B2
(45) Date of Patent: Feb. 14, 2012

(54) DIGITIZING DOCUMENTS

(75) Inventors: Asaf Tzadok, Nesher (IL); Eugeniusz Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 12/246,626

(22) Filed: Oct. 7, 2008

(65) Prior Publication Data

US 2010/0086210 A1 Apr. 8, 2010

(51) Int. Cl.
*G06K 9/00* (2006.01)
*G06K 9/46* (2006.01)

(52) U.S. Cl. ......................... 382/181; 382/176; 382/190

(58) Field of Classification Search .................. 382/171, 382/176, 173, 199, 100, 115, 119, 137, 181, 382/186, 276, 278, 123, 121, 122, 120, 190, 382/195; 713/176, 180, 177, 175, 168; 716/100, 716/101, 103; 715/205, 268; 235/380, 494; 705/76, 51; 707/E17.013, 999.01
See application file for complete search history.

(56) References Cited

U.S. PATENT DOCUMENTS

| | | | | |
|---|---|---|---|---|
| 4,564,752 | A | 1/1986 | Lepic et al. | |
| 7,043,052 | B2 * | 5/2006 | Rhoads | 382/100 |
| 7,113,596 | B2 * | 9/2006 | Rhoads | 380/54 |
| 7,831,098 | B2 * | 11/2010 | Melikian | 382/215 |
| 7,869,098 | B2 * | 1/2011 | Corso et al. | 358/405 |
| 7,945,781 | B1 * | 5/2011 | Rhoads | 713/176 |
| 7,992,003 | B2 * | 8/2011 | Rhoads | 713/176 |
| 2004/0264774 | A1 * | 12/2004 | Anisimovich et al. | 382/173 |
| 2009/0087094 | A1 * | 4/2009 | Deryagin et al. | 382/180 |

OTHER PUBLICATIONS

Beusekom et al., Image-Matching for Revision Detection in Printed Historical Documents.

* cited by examiner

*Primary Examiner* — Sheela Chawan
(74) *Attorney, Agent, or Firm* — Ryan, Mason & Lewis, LLP

(57) ABSTRACT

Techniques for performing page verification of a document are provided. The techniques include performing a recognition technique on a document to recognize one or more objects in the document, excluding the one or more recognized objects from the document, and performing page verification of the document, wherein page verification comprises visual inspection of the document excluding the one or more recognized objects.

24 Claims, 6 Drawing Sheets

*FIG. 2*

Analysis is included in a separate attached document. – A. Leach 204

INTRODUCTION.

SCEPTICISM is as much the result of knowledge, as knowledge is of scepticism. To be content with what we at present know, is, for the most part, to shut our ears against conviction; since, from the very gradual character of our education, we must continually forget, and emancipate ourselves from, knowledge previously acquired; we must set aside old notions and embrace fresh ones; and, as we learn, we must be daily unlearning something which it has cost us no small labour and anxiety to acquire.

And this difficulty attaches itself more closely to an age in which progress has gained a strong ascendency over prejudice, and in which persons and things are, day by day, finding their real level, in lieu of their conventional value. The same principles which have swept away traditional abuses, and which are making rapid havoc among the revenues of sinecurists, and stripping the thin, tawdry veil from attractive superstitions, are working as actively in literature as in society. The credulity of one writer, or the partiality of another, finds as powerful a touchstone and as wholesome a chastisement in the healthy scepticism of a temperate class of antagonists, as the dreams of conservatism, or the impostures of pluralist sinecures in the Church. History and tradition, whether of ancient or comparatively recent times, are subjected to very different handling from that which the indulgence or credulity of former ages could allow. Mere statements are jealously watched, and the motives of the writer form as important an ingredient in the analysis of his history, as the facts he records. Probability is a powerful and troublesome test; and it is by this troublesome standard that a large portion of historical evidence is sifted. Consistency is no less pertinacious and exacting in its demands. In brief, to write a history, we must know more than mere facts. Human nature, viewed under an induction of extended experience,. is the best help to the criticism of human history. Historical characters can only be estimated by the standard which human experience, whether actual or traditionary, has furnished. To form} correct views of individuals we must regard them as forming parts of a great whole –we must measure them by their relation to the mass of beings by whom they are surrounded, and, in contemplating the incidents in their

INTRODUCTION.

SCEPTICISM is as much the result of knowledge, as knowledge is of scepticism. To be content with what we at present know, is, for the most part, to shut our ears against conviction; since, from the very gradual character of our education, we must continually forget, and emancipate ourselves from, knowledge previously acquired; we must set aside old notions and embrace fresh ones; and, as we learn, we must be daily unlearning something which it has cost us no small labour and anxiety to acquire.

And this difficulty attaches itself more closely to an age in which progress has gained a strong ascendency over prejudice, and in which persons and things are, day by day, finding their real level, in lieu of their conventional value. The same principles which have swept away traditional abuses, and which are making rapid havoc among the revenues of sinecurists, and stripping the thin, tawdry veil from attractive superstitions, are working as actively in literature as in society. The credulity of one writer, or the partiality of another, finds as powerful a touchstone and as wholesome a chastisement in the healthy scepticism of a temperate class of antagonists, as the dreams of conservatism, or the impostures of pluralist sinecures in the Church. History and tradition, whether of ancient or comparatively recent times, are subjected to very different handling from that which the indulgence or credulity of former ages could allow. Mere statements are jealously watched, and the motives of the writer form as important an ingredient in the analysis of his history, as the facts he records. Probability is a powerful and troublesome test; and it is by this troublesome standard that a large portion of historical evidence is sifted. Consistency is no less pertinacious and exacting in its demands. In brief, to write a history, we must know more than mere facts. Human nature, viewed under an induction of extended experience, is the best help to the criticism of human history. Historical characters can only be estimated by the standard which human experience, whether actual or traditionary, has furnished. To form correct views of individuals we must regard them as forming parts of a great whole—we must measure them by their relation to the mass of beings by whom they are surrounded, and, in contemplating the incidents in their

ANALYSIS IS INCLUDED IN A SEPARATE ATTACHED DOCUMENT.
- A. LEACH

504

INTRODUCTION.

SCEPTICISM is as much the result of knowledge, as knowledge is of scepticism. To be content with what we at present know, is, for the most part, to shut our ears against conviction; since, from the very gradual character of our education, we must continually forget, and emancipate ourselves from, knowledge previously acquired; we must set aside old notions and embrace fresh ones; and, as we learn, we must be daily unlearning something which it has cost us no small labour and anxiety to acquire.

And this difficulty attaches itself more closely to an age in which progress has gained a strong ascendency over prejudice, and in which persons and things are, day by day, finding their real level, in lieu of their conventional value. The same principles which have swept away traditional abuses, and which are making rapid havoc among the revenues of sinecurists, and stripping the thin, tawdry veil from attractive superstitions, are working as actively in literature as in society. The credulity of one writer, or the partiality of another, finds as powerful a touchstone and as wholesome a chastisement in the healthy scepticism of a temperate class of antagonists, as the dreams of conservatism, or the impostures of pluralist sinecures in the Church. History and tradition, whether of ancient or comparatively recent times, are subjected to very different handling from that which the indulgence or credulity of former ages could allow. Mere statements are jealously watched, and the motives of the writer form as important an ingredient in the analysis of his history, as the facts he records. Probability is a powerful and troublesome test; and it is by this troublesome standard that a large portion of historical evidence is sifted. Consistency is no less pertinacious and exacting in its demands. In brief, to write a history, we must know more than mere facts. Human nature, viewed under an induction of extended experience, is the best help to the criticism of human history. Historical characters can only be estimated by the standard which human experience, whether actual or traditionary, has furnished. To form correct views of individuals we must regard them as forming parts of a great whole—we must measure them by their relation to the mass of beings by whom they are surrounded, and, in contemplating the incidents in their

502

DIGITIZING DOCUMENTS

FIELD OF THE INVENTION

The present invention generally relates to information technology, and, more particularly, to document digitization.

BACKGROUND OF THE INVENTION

Many enterprise processes today involve paper digitization. One can also see a significant shift towards paper archive digitization. A common existing digitization process includes scanning and an optical character recognition (OCR) application followed by manual verification and/or key-in and saving the data in a database. However, there is no fast and robust verification methodology in this process to ensure that the whole important data in the paper is saved.

Existing approaches include a side-by-side approach where the original scan is shown on one side and the recognized content on the other side. However, such an approach is a laborious process. In such an approach, an operator is forced to view the entire page to be entered, rather than focusing on the specific word in question. Accordingly, many systems have been proposed such that, at any given moment, an operator sees only the word being corrected or even few smaller snippets of information (characters). Such existing approaches enhance operator productivity, but also include an undesirable side effect, in that the operator may miss information that was omitted by the OCR process (for example, handwritten remarks added on the book margins).

SUMMARY OF THE INVENTION

Principles of the present invention provide techniques for digitizing documents. An exemplary method (which may be computer-implemented) for performing page verification of a document, according to one aspect of the invention, can include steps of include performing a recognition technique on a document to recognize one or more objects in the document, excluding the one or more recognized objects from the document, and performing page verification of the document, wherein page verification comprises visual inspection of the document excluding the one or more recognized objects.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus or system including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include hardware module(s), software module(s), or a combination of hardware and software modules.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a diagram illustrating an exemplary original document image with printed text and hand-written material, according to an embodiment of the present invention;

FIG. 3 is a diagram illustrating exemplary OCR results of a document that include printed text only, according to an embodiment of the present invention;

FIG. 5 is a diagram illustrating an exemplary resulting output document that includes printed text with added comment including the content of the hand-written material in printed form, according to an embodiment of the present invention;

DETAILED DESCRIPTION OF PREFERRED EMBODIMENTS

Figure 1:
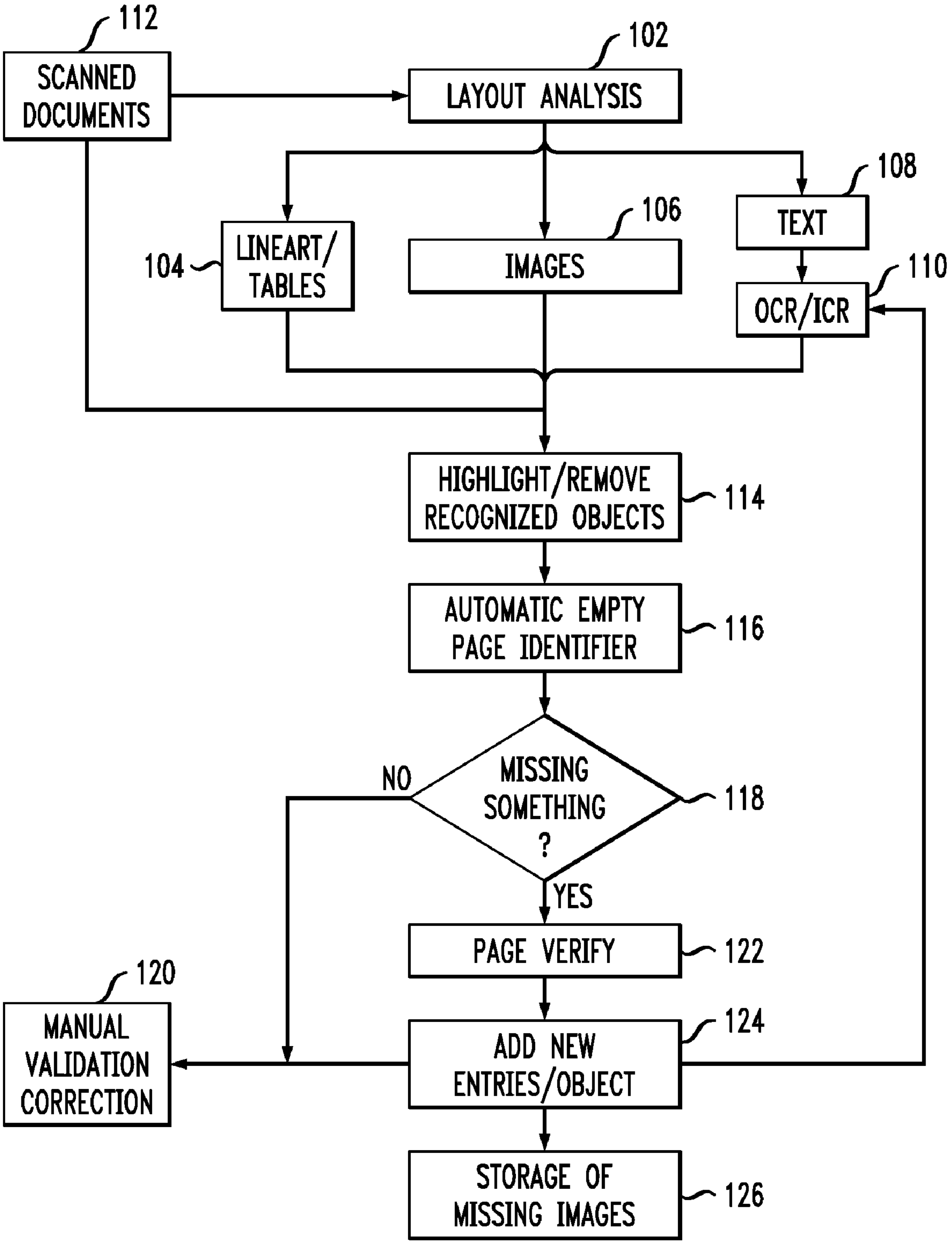
FIG. 1 is a diagram illustrating a page verifier process, according to an embodiment of the present invention.

Principles of the present invention include a page verifier for optical character recognition (OCR) based systems. One or more embodiments of the invention include adding an additional stage (that is, a page verifier stage) after a character recognition process (for example, OCR, intelligent character recognition (ICR), etc.). This additional stage can be activated, for example, before or after manual validation and/or correction of OCR results. As described herein, in one or more embodiments of the invention, an operator can perform rapid review of OCR results and indicate missing areas to be reprocessed.

At a point at which one adds a page verifier stage (for example, after an OCR stage), one or more embodiments of the invention determine what parts of the text have been handled. At this stage, one can indicate merely that certain areas of the page have been processed. These areas can include different objects such as, for example, text, figures, tables, line arts, etc.

One or more embodiments of the invention use these results (that is, what parts of the text have been processed) in order to modify a scanned page image. This modification can be done, for example, via one or more of the following techniques. One can remove, from the scanned document, all the rectangles and/or masks of extracted content. Also, one can highlight the scanned document in all of the rectangles and/or masks of extracted content.

When looking at the modified scan, the operator would be able to see, at a single glance, whether any significant information has been missing. If missing areas have been detected, the operator can identify them (for example, by drawing a bounding rectangle) and forward them for further processing. Such processing can include, for example, an additional OCR round, intelligent character recognition (ICR) (if hand printed text has been detected), manual data entry and/or storage as a separate image with or without additional tagging.

One or more embodiments of the invention can show, simultaneously, on the same screen, several pages to be verified in order to expedite the verification process. Moreover, in one or more embodiments of the invention, an automatic algorithm can be added, aimed at automatic identification of pages without any missing information (for example, by denoising residue image obtained after the removal of OCR processed areas). As such, an operator can very easily see all of the potentially neglected content and decide whether it should be address or not.

One or more embodiments of the present invention can also be used with digitization of books (for example, annotated books). As described herein, an operator can identify missing areas. Moreover, the techniques detailed herein include removal of the recognized data (rather than highlighting the missing part). As a result, manual review is much faster. For example, one can show and/or review several pages on a single screen, further facilitating the correction process.

Further, the techniques described herein can also include separation between location of the missing data and actual data entry.

FIG. 1 is a diagram illustrating a page verifier process, according to an embodiment of the present invention. Step 102 includes performing layout analysis. Step 104 includes examining line art and/or tables. Step 106 includes examining images. Step 108 includes examining text. Also, step 110 includes performing OCR and/or ICR. Step 112 includes examining scanned documents.

Additionally, step 114 includes highlighting and/or removing recognized objects. Step 116 includes using an automatic empty page identifier. Step 118 includes determining whether something is missing. If the answer to the question in step 118 is no, one can perform manual validation correction in step 120. If the answer to the question in step 118 is yes, one can perform page verification in step 122. Also, step 124 includes adding new entries and/or objects. Further, step 126 includes storing missing images.

By way of example, one or more embodiments of the invention can proceed in a fashion such as illustrated in FIG. 2 through FIG. 5.

FIG. 2 is a diagram illustrating an original document image with printed text 202 and hand-written material 204, according to an embodiment of the present invention. An original page image can include, for example, image information only. FIG. 3 is a diagram illustrating exemplary OCR results of a document that include printed text 302 only, according to an embodiment of the present invention. OCR results can include, for example, the printed section in a different font in order to illustrate that the now-printed information is accessible in the ASCII form.

Figure 4:
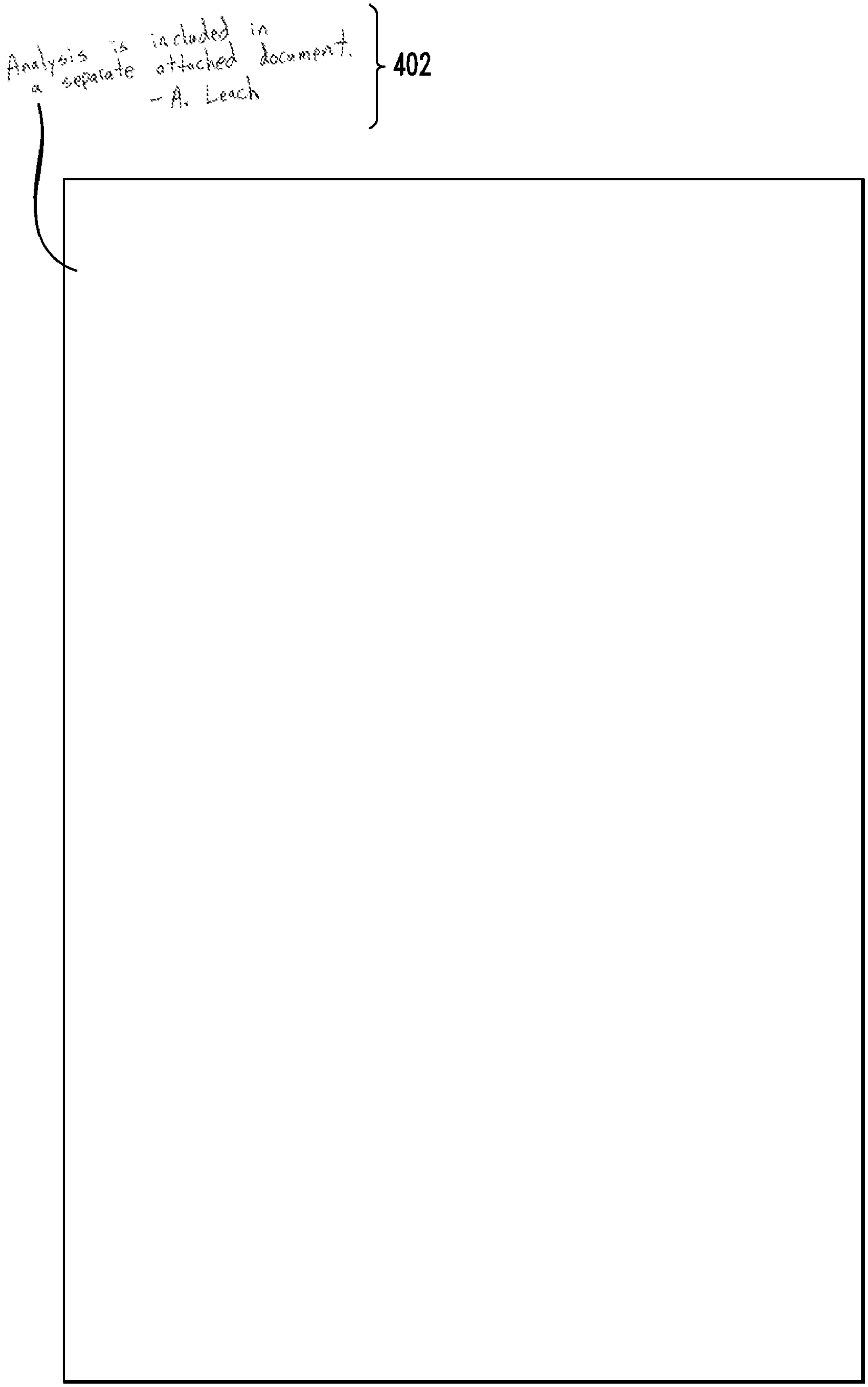
FIG. 4 is a diagram illustrating exemplary input to a page verifier that includes hand-written material only, according to an embodiment of the present invention.

FIG. 4 is a diagram illustrating exemplary input to a page verifier that includes hand-written material 402 only, according to an embodiment of the present invention. Also, FIG. 5 is a diagram illustrating an exemplary resulting output document that includes printed text 502 with an added comment including the content of the hand-written material in printed form 504, according to an embodiment of the present invention. It is to be understood that the invention is not limited to the embodiments depicted in FIG. 2 through FIG. 5, as they are merely illustrative, and that various other changes and modifications may be made to one or more embodiments of the invention, as described herein.

Figure 6:
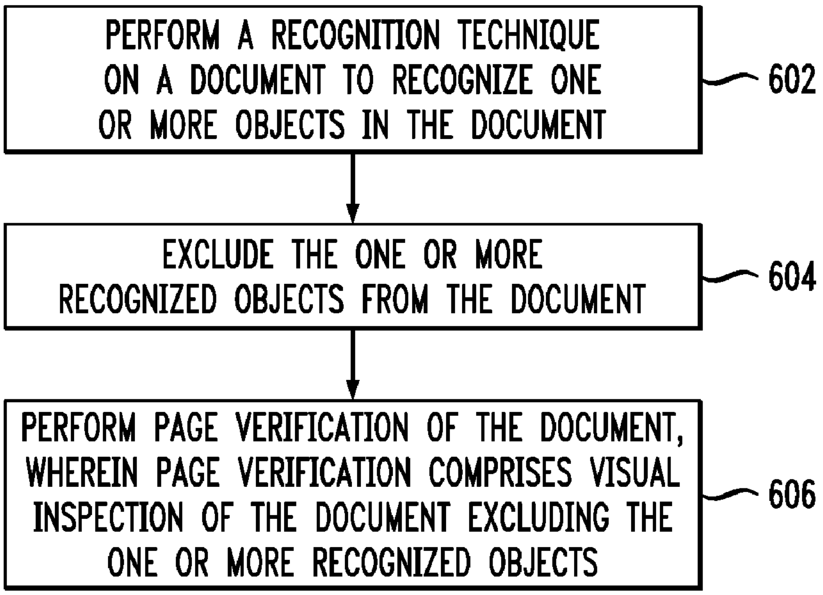
FIG. 6 is a flow diagram illustrating techniques for performing page verification of a document, according to an embodiment of the present invention.

FIG. 6 is a flow diagram illustrating techniques for performing page verification of a document, according to an embodiment of the present invention. Step 602 includes performing a recognition technique (for example, optical character recognition (OCR), intelligent character recognition (ICR), etc.) on a document to recognize one or more objects in the document.

Step 604 includes excluding the one or more recognized objects from the document. The objects can include, for example, text, figures, tables, line arts and/or images. One or more embodiments of the invention include identifying one or more missing areas by drawing a bounding rectangle around the missing areas and forwarding the missing areas for further processing (such as, for example, OCR (or additional OCR), intelligent character recognition (ICR), manual data entry and storage as a separate image with or without additional tagging).

Step 606 includes performing page verification of the document, wherein page verification comprises visual inspection (for example, visual inspection of either single page or multiple pages on the same screen) of the document excluding the one or more recognized objects (for example, information that has been handled already by an OCR process followed by the manual data correction). As opposed to disadvantageous existing approaches that include an OCR application followed by manual verification and/or key-in and saving the data in a database, page verification, as described herein, includes a fast and robust verification methodology to ensure that the entirety of the data in the document is saved. Additionally, the page verification can be performed, for example, before and/or after a manual validation of the recognition technique.

Performing page verification of the document, as described in one or more embodiments of the invention herein, facilitates viewing potentially neglected content in the document and deciding whether the potentially neglected content should be address or not. For example, an operator will be able to view information that was omitted by the OCR process such as, for example, handwritten remarks added on the book margins. As such, unlike the disadvantageous existing approaches, page verification, in one or more embodiments of the present invention, can be performed virtually at a single glance.

The techniques depicted in FIG. 6 can also include using one or more identified objects to modify a scanned page image. Modifying a scanned page image can include removing, from the scanned page image, content marked for extraction. Also, modifying a scanned page image can include highlighting content marked for extraction in the scanned page image. Further, one or more embodiments of the present invention can include de-noising a residue image obtained after removal of recognition technique-processed areas.

By way of example and not limitation, the above-noted steps depicted in FIG. 6 can be embodied by the example illustrated in FIG. 2 through FIG. 5. Performing a recognition technique on a document to recognize objects in the document can include, for example, performing a recognition technique (such as OCR) on the images depicted in FIG. 2 and generating a resulting image such as depicted in FIG. 3. Also, excluding the recognized objects from the document can include, for example, excluding, as depicted in FIG. 4, the printed text and leaving the hand-written material 402. Further, performing page verification of the document can include visual inspection of the document excluding the recognized objects (for example, the hand-written material 402 as depicted in FIG. 4), and a resulting page can be generated such as, for example, the page depicted in FIG. 5 that includes printed text 502 with an added comment including the content of the hand-written material in printed form 504.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 7:
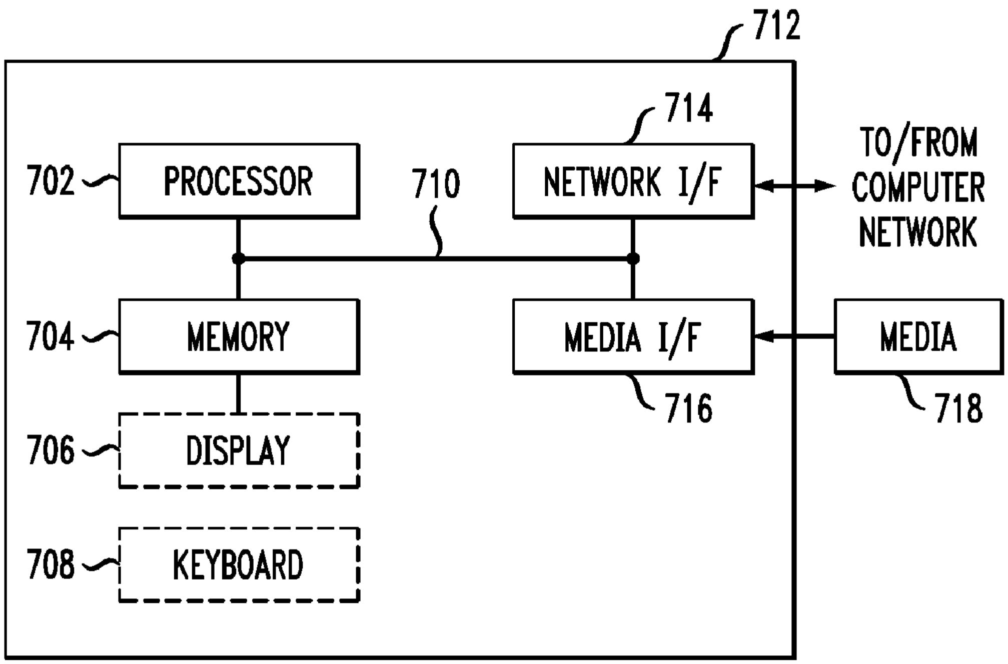
FIG. 7 is a system diagram of an exemplary computer system on which at least one embodiment of the present invention can be implemented.

At present, it is believed that the preferred implementation will make substantial use of software running on a general-purpose computer or workstation. With reference to FIG. 7, such an implementation might employ, for example, a processor 702, a memory 704, and an input and/or output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 702, memory 704, and input and/or output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 718) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 704), magnetic tape, a removable computer diskette (for example, media 718), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 702 coupled directly or indirectly to memory elements 704 through a system bus 710. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, showing, simultaneously, on the same screen, several pages to be verified in order to expedite the verification process.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for performing page verification of a document, comprising the steps of:

performing a recognition technique on a document to recognize one or more objects in the document;

excluding the one or more recognized objects from the document; and performing page verification of the document, wherein page verification comprises visual inspection of the document excluding the one or more recognized objects and further comprises facilitating viewing potentially neglected content in the document and deciding whether the potentially neglected content should be addressed or not;

wherein at least one of the steps is carried out by a computer device.

2. The method of claim 1, wherein page verification is performed before a manual validation of the recognition technique.

3. The method of claim 1, wherein page verification is performed after a manual validation of the recognition technique.

4. The method of claim 1, wherein the one or more objects comprise at least one of text, one or more figures, one or more tables, one or more line arts and one or more images.

5. The method of claim 1, further comprising identifying one or more missing areas by drawing a bounding rectangle around the one or more missing areas and forwarding the one or more missing areas for further processing.

6. The method of claim 5, wherein the further processing comprises at least one of optical character recognition (OCR), intelligent character recognition (ICR), manual data entry and storage as a separate image.

7. The method of claim 1, further comprising using one or more identified objects to modify a scanned page image.

8. The method of claim 7, wherein modifying a scanned page image comprises removing, from the scanned page image, content marked for extraction.

9. The method of claim 7, wherein modifying a scanned page image comprises highlighting content marked for extraction in the scanned page image.

10. The method of claim 1, further comprising de-noising a residue image obtained after removal of one or more recognition technique-processed areas.

11. The method of claim 1, wherein the recognition technique comprises at least one of optical character recognition (OCR) and intelligent character recognition (ICR).

12. A tangible computer readable recordable storage medium having computer readable program code for performing page verification of a document, said computer program product including:

computer readable program code for performing a recognition technique on a document to recognize one or more objects in the document;

computer readable program code for excluding the one or more recognized objects from the document; and computer readable program code for performing page verification of the document, wherein page verification comprises visual inspection of the document excluding the one or more recognized objects and further comprises facilitating viewing potentially neglected content in the document and deciding whether the potentially neglected content should be addressed or not.

13. The tangible computer readable recordable storage medium of claim 12, wherein the one or more objects comprise at least one of text, one or more figures, one or more tables, one or more line arts and one or more images.

14. The tangible computer readable recordable storage medium of claim 12, further comprising computer readable program code for identifying one or more missing areas by drawing a bounding rectangle around the one or more missing areas and forwarding the one or more missing areas for further processing.

15. The tangible computer readable recordable storage medium of claim 12, further comprising computer readable program code for using one or more identified objects to modify a scanned page image.

16. The tangible computer readable recordable storage medium of claim 12, further comprising computer readable program code for de-noising a residue image obtained after removal of one or more recognition technique-processed areas.

17. The tangible computer readable recordable storage medium of claim 12, wherein the recognition technique comprises at least one of optical character recognition (OCR) and intelligent character recognition (ICR).

18. An apparatus for performing page verification of a document, comprising:

a memory; and at least one processor coupled to said memory and operative to:

perform a recognition technique on a document to recognize one or more objects in the document;

exclude the one or more recognized objects from the document; and perform page verification of the document, wherein page verification comprises visual inspection of the document excluding the one or more recognized objects and further comprises facilitating viewing potentially neglected content in the document and deciding whether the potentially neglected content should be addressed or not.

19. The apparatus of claim 18, wherein the one or more objects comprise at least one of text, one or more figures, one or more tables, one or more line arts and one or more images.

20. The apparatus of claim 18, wherein the at least one processor coupled to said memory is further operative to identify one or more missing areas by drawing a bounding rectangle around the one or more missing areas and forwarding the one or more missing areas for further processing.

21. The apparatus of claim 18, wherein the at least one processor coupled to said memory is further operative to use one or more identified objects to modify a scanned page image.

22. The apparatus of claim 18, wherein the at least one processor coupled to said memory is further operative to de-noise a residue image obtained after removal of one or more recognition technique-processed areas.

23. The apparatus of claim 18, wherein the recognition technique comprises at least one of optical character recognition (OCR) and intelligent character recognition (ICR).

24. An apparatus for performing page verification of a document, said apparatus comprising:

means for performing a recognition technique on a document to recognize one or more objects in the document;

means for excluding the one or more recognized objects from the document; and means for performing page verification of the document, wherein page verification comprises visual inspection of the document excluding the one or more recognized objects and further comprises facilitating viewing potentially neglected content in the document and deciding whether the potentially neglected content should be addressed or not.

* * * * *